United States Patent
Margulies et al.

(10) Patent No.: US 6,670,032 B2
(45) Date of Patent: Dec. 30, 2003

(54) ORIENTED MAGNETIC MEDIUM ON A NONMETALLIC SUBSTRATE

(75) Inventors: David Thomas Margulies, Gilroy, CA (US); Timothy Martin Reith, San Jose, CA (US); Hoa Do, Fremont, CA (US); Tim Minvielle, San Jose, CA (US); James A. Hagan, Rochester, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 118 days.

(21) Appl. No.: 09/952,788

(22) Filed: Sep. 13, 2001

(65) Prior Publication Data

US 2003/0049497 A1 Mar. 13, 2003

(51) Int. Cl.[7] .................................................. G11B 5/66
(52) U.S. Cl. .................. 428/332; 428/336; 428/694 TS; 428/694 T; 428/694 SG; 428/900; 427/128; 427/129; 427/130
(58) Field of Search ...................... 628/694 TS, 694 ST, 628/694 SG, 332, 336, 900; 427/128–130

(56) References Cited

U.S. PATENT DOCUMENTS

| | | | |
|---|---|---|---|
| 5,084,152 A | 1/1992 | Lin et al. | 204/192.15 |
| 5,384,175 A | 1/1995 | Kojima et al. | 428/64 |
| 5,536,585 A | 7/1996 | Futamoto et al. | 428/611 |
| 5,685,958 A | 11/1997 | Futamoto et al. | 204/192.2 |
| 5,733,370 A | 3/1998 | Chen | 117/105 |
| 5,830,584 A | 11/1998 | Chen | 428/611 |
| 5,922,456 A | 7/1999 | Tanahashi et al. | 428/332 |
| 6,036,824 A | 3/2000 | Hedgcoth | 204/192.16 |
| 6,150,015 A | 11/2000 | Bertero et al. | 428/332 |
| 6,150,016 A * | 11/2000 | Song | 428/332 |
| 6,174,582 B1 | 1/2001 | Bian et al. | 428/65.3 |
| 6,218,028 B1 * | 4/2001 | Song et al. | 428/611 |
| 6,472,049 B2 * | 10/2002 | Song et al. | 428/141 |
| 6,509,083 B2 * | 1/2003 | Song et al. | 428/141 |

FOREIGN PATENT DOCUMENTS

| | | |
|---|---|---|
| JP | 4285723 A | 10/1992 |
| JP | 5081637 A | 4/1993 |

* cited by examiner

Primary Examiner—Leszek Kiliman
(74) Attorney, Agent, or Firm—Lewis L. Nunnelley

(57) ABSTRACT

This invention provides a disk which has an in-plane oriented magnetic recording layer on a glass, ceramic, or other nonmetallic substrate and a method for making the disk. A thin layer of material is deposited on the substrate to form a texture stop layer. A texturable layer is then deposited on the texture stop layer. This texturable layer is textured before the magnetic layer is deposited. The disk combines all the advantages of a glass or ceramic substrate along with the advantages of an oriented magnetic medium.

9 Claims, 2 Drawing Sheets

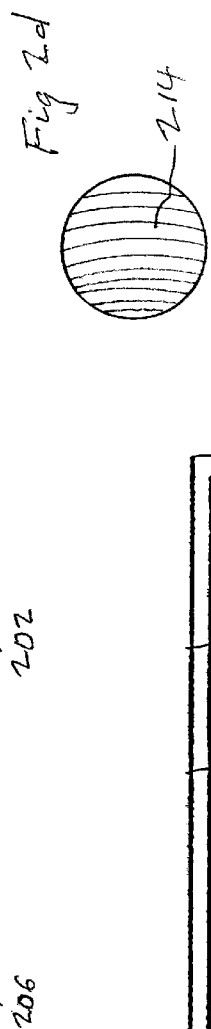
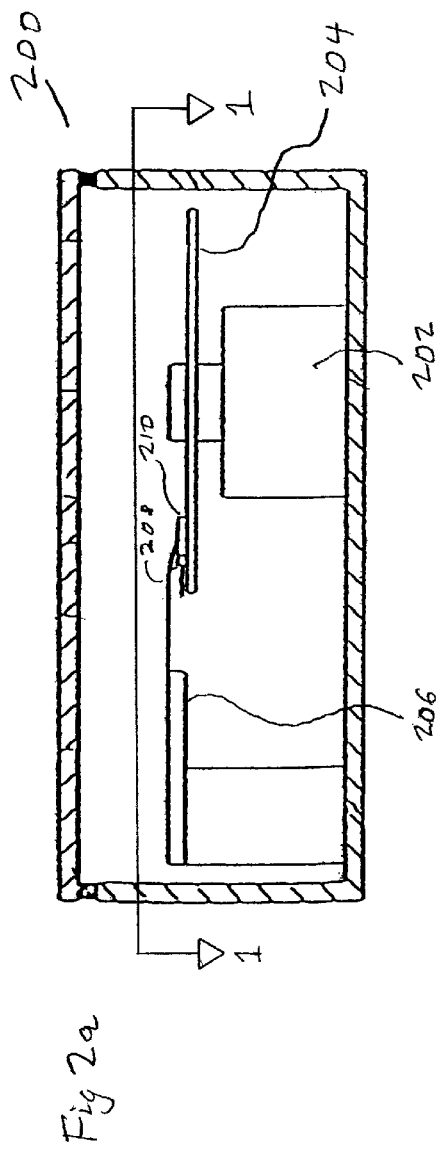
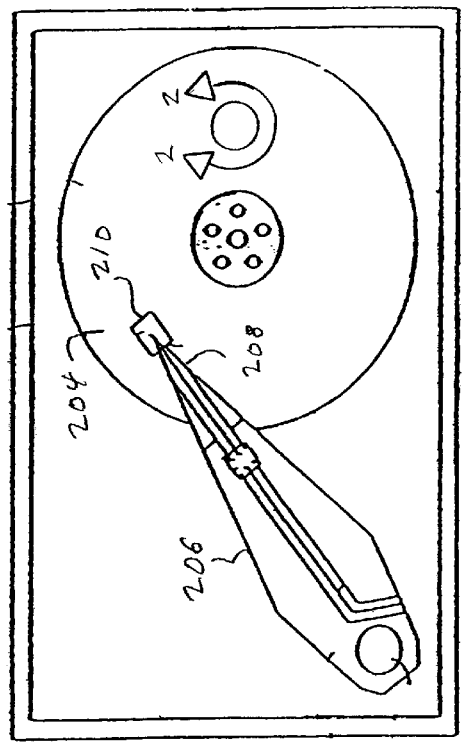

ORIENTED MAGNETIC MEDIUM ON A NONMETALLIC SUBSTRATE

BACKGROUND OF THE INVENTION

1. Field of the Invention

This invention relates generally to a disk used for magnetic recording in a disk drive and more specifically to an oriented magnetic medium on a non-metallic substrate.

2. Description of the Background Art

Disk drives using magnetic recording of digital information comprise most of the information storage in contemporary computer systems. Disk drives have at least one rotating disk with discrete concentric tracks of data. There is at least one recording head typically comprising a separate write element and read element for writing and reading the data on the tracks. The recording head is attached to a slider and the slider is attached to a suspension. The combination of the recording head, slider and suspension is called a head gimbal assembly. In addition, there is an actuator which positions the recording head over the specific track of interest. The actuator first rotates to seek the track of interest and after positioning the recording head over that track maintains the recording head in close registration to that track.

The disk in a disk drive comprises a substrate and a magnetic layer on the substrate for magnetic recording. Substrates are typically either metal or glass. Metal substrates are typically made from an alloy of aluminum and magnesium. Glass substrates can be made with standard sodium borosilicate glass, harder grades of glass, or known glass composites. Substrates may also be made from silicon or a ceramic material. Silicon and ceramic disks offer many of the same technical advantages as glass but are generally more expensive. The magnetic layer is usually a cobalt based alloy suitable for magnetic recording. Disks generally have other layers in addition to the magnetic layer. There is usually a carbon based overcoat deposited on the magnetic layer for durability. Also there may be other layers disposed between the substrate and the magnetic layer to promote better adhesion or to improve the magnetic properties of the recording layer. One or more underlayers deposited for the purpose of influencing the crystalline growth of the magnetic layer will be called herein a magnetic underlayer. The magnetic underlayer is generally itself non-magnetic and merely influences the properties of the magnetic recording layer.

When using metal substrates it is customary to electrolessly plate from a solution an underlayer of NiP with a thickness of several microns (typically 3–5 $\mu$m) to cover some of the defects usually encountered in the substrate. A relatively thick layer of NiP is known to accept a mechanical texture. The composition of the NiP layer on a metal substrate using a deposition from solution is typically about 11% P by weight. This deposition method used with metal substrates produces the amorphous form of NiP. The crystalline form of NiP is magnetic and, if present, would degrade the magnetic recording properties of the disk.

Glass substrates have several advantages over metal substrates. Generally the surface of a glass substrate is smoother than the surface of a metal substrate. This is a significant advantage as the spacing between the disk and recording head must decrease as the areal density increases. A second advantage is that glass is a harder material than aluminum and therefore is more resistant to damage arising from inadvertent contact between the slider and the disk. A third advantage of using glass substrates is that glass substrates are stiffer than metal substrates thus allowing glass substrates to be used at higher rotation speeds. Another advantage of using glass for substrates is that glass has fewer detrimental effects during process temperature excursions compared with metal substrates. These advantages are generally known in the art.

For longitudinal media, orientation from crystallographic effects arises from constraining the c-axis of the magnetic film to lie in the plane of the magnetic layer. This orientation is normally isotropic within the plane of the magnetic recording layer. If the magnetic layer is deposited on a surface which has been textured in a preferentially circumferential direction, then the orientation will also be preferentially circumferential for layers of practical interest. In this case the orientation will no longer be isotropic within the plane of the magnetic recording layer. The orientation ratio (OR) refers to the ratio of the product of the remanent magnetization and the magnetic film thickness (Mrt) when measured in the circumferential direction relative to the Mrt in the radial direction. An OR of 1.0 indicates that the Mrt is the same when measured both circumferentially and radially, and the media is said to be two dimensionally isotropic in the film plane. A disk with an OR greater than 1.0 generally has superior magnetic performance compared to isotropic disks. Circumferential in-plane orientation is commonly induced in recording layers on metal substrates by mechanically texturing the substrate or, more commonly, the NiP underlayer. Mechanical texturing on metal substrates leaves small elongated indentations or small, shallow scratches in a generally circumferential direction.

Glass substrates are much more difficult to mechanically texture. Because glass is relatively brittle, texturing glass directly generally results in fracture pits, gouges, irregular scratches and other unacceptable artifacts. It is known to photolithographically produce grooves in a glass substrate, however this method is expensive and more difficult than mechanical texturing. Also the feature size available from a photolithographic process is generally larger than desired. As a consequence, glass substrates are rarely textured and the magnetic layers on glass substrates rarely have in-plane circumferential orientation.

There is needed an improved magnetic medium having magnetic orientation on a glass substrate and a practical method of making the medium with circumferential orientation.

SUMMARY OF THE INVENTION

An embodiment of this invention provides a disk which has an in-plane circumferential oriented recording layer on a glass or ceramic substrate and a method for making the disk. The disk representing this embodiment of the invention combines the mechanical advantages of a glass substrate with the improved magnetic performance of an oriented magnetic medium.

In one embodiment the disk has a nonmetallic substrate, a texture stop layer formed on the substrate, a textured layer formed on the texture stop layer, a magnetic layer formed over the textured underlayer, and an overcoat formed on the magnetic layer. The textured layer is textured in a substantially circumferential direction. The disk can have a magnetic underlayer disposed between the magnetic layer and the textured layer. The substrate of the disk is generally formed from glass or other suitable nonmetallic substrate material. The texture stop layer functions to prevent damage to the nonmetallic substrate. Generally the texture stop layer is made from a suitable, relatively hard material such as chromium, titanium, tantalum, tungsten, boron nitride, tantalum nitride, vanadium, niobium, molybdenum, carbon, zirconium, boron carbide, silicon carbide, titanium carbide, or titanium nitride. Generally the textured layer is made of a texturable material such as aluminum, copper, NiP, ruthenium, palladium, platinum, tin, lead, silver, or gold. This texturable layer is textured (preferably with a mechanical texturing method) before the magnetic underlayer and magnetic layer are deposited onto the disk.

In another embodiment of the invention a disk with a texture stop layer and a textured layer is utilized in a disk drive.

Other aspects and advantages of the present invention will become apparent from the following detailed description along with the drawings, showing by way of examples the principles of the invention.

BRIEF DESCRIPTION OF THE DRAWINGS

FIG. 2a shows a cross sectional view of a disk drive;

FIG. 2b shows a top down view of the disk drive;

FIG. 2c shows an enlarged area of the disk surface showing one embodiment of texture features; and, FIG. 2d shows an enlarged area of the disk surface showing an alternative embodiment of texture features.

DETAILED DESCRIPTION OF THE INVENTION

Figure 1:
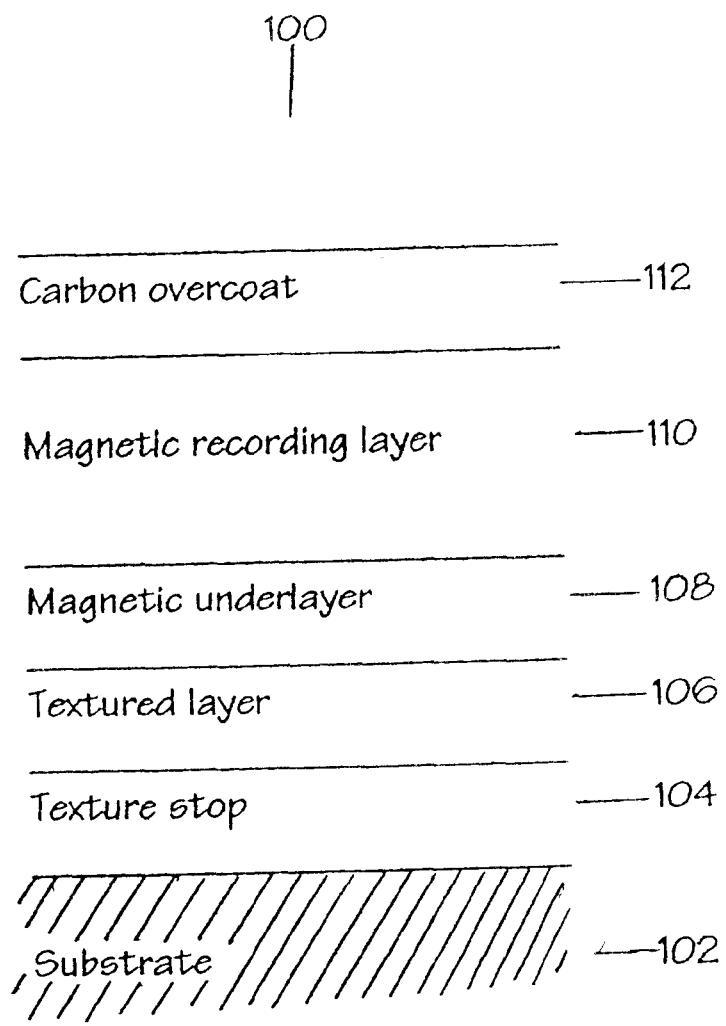
FIG. 1 shows a cross section of one embodiment of a disk of the present invention.

One embodiment of this invention provides a disk which has an in-plane circumferential oriented magnetic recording layer on a nonmetallic substrate. Texturing a glass substrate generally causes unacceptable damage to the substrate. It is also difficult to obtain OR values significantly greater than 1.0 when glass is directly textured. Thus, magnetic recording disks on glass substrates are generally not oriented. Accordingly, disks made with glass substrates do not generally have the mechanical advantages of glass combined with the improved magnetic recording performance coming from orientation.

FIG. 1 shows a cross sectional view of a preferred embodiment of the present invention. The disk 100 has a nonmetallic substrate 102. The substrate 102 is polished using known, conventional means to achieve a smooth surface. Next, a nonmagnetic texture stop layer 104 is deposited, e.g. using sputtering, on the substrate. A layer 106 is deposited on the texture stop layer 104. This layer 106 is formed from texturable material and is called the textured layer. The textured layer 106 is deposited and subsequently mechanically textured using known abrasive polishing techniques to achieve substantially circumferential texturing. It is also possible to press or stamp a textured surface into the textured layer 106. In FIG. 1, an optional magnetic underlayer 108 has been deposited on the textured layer 106. Other layers may be added to promote better adhesion or to achieve better magnetic crystallographic orientation. The magnetic recording layer 110, commonly having a cobalt alloy, is formed on the magnetic underlayer 108 if present, or directly on the textured layer 106. Finally a layer of overcoat 112, usually carbon based, is deposited on the magnetic layer 110.

The texture stop layer 104 serves as a texture stop when the textured layer 106 is mechanically textured. The texture stop layer 104 preferably is a material which is harder than the textured layer 106. The texture stop layer 104 functions to stop the mechanical texturing process used to texture the textured layer 106 from damaging the underlying substrate 102 by interposing a layer of material, preferably a harder material, between the textured layer 106 and the substrate 102. The texture stop layer 104 also functions to limit the roughness induced by the texturing process and to limit the debris generated by the texturing process. The control of debris is accomplished by controlling the thickness of the layer which gets textured and therefore the amount of generated debris. The texture stop layer 104 optionally also promotes good adhesion between the textured layer 106 and the substrate 102. The texture stop layer 104 also serves to preserve the smoothness of the substrate surface. Accordingly, a suitable thickness of the texture stop layer 104 is less than approximately 500 nm thick. The minimum thickness depends to an extent on the hardness of the chosen material but is usually greater than about 5 nm. Finally, the materials chosen for the texture stop layer 104 are suitably compatible with sputtering deposition. There are several appropriate suitable materials for the texture stop layer 104 including chromium, chromium rich alloys, titanium, tantalum, tungsten, boron nitride, and tantalum nitride. Other materials which are also suitable include vanadium, niobium, molybdenum, carbon, zirconium, boron carbide, silicon carbide, titanium carbide, and titanium nitride. Some of these latter materials are more expensive.

The main function of the textured layer 106 is to accept a textured topography from a texturing process. Accordingly, the preferred material for the textured layer 106 is preferably more ductile than the material in the texture stop layer 104. The thickness of the textured layer 106 is preferably thin enough to preserve the smoothness of the underlying surface of the substrate 102. Generally the textured layer 106 is less than about 200 nm and perhaps as thin as about 5 nm. Another reason to keep the textured layer 106 relatively thin is that as the thickness of the textured layer 106 is reduced, the take off height is also reduced. The take off height of the disk is the height above the surface when a slider begins to fly free of contact with the disk. Generally it is desired to minimize the take off height. Appropriate choices of materials for the textured layer 106 include aluminum, copper, and NiP. Other ductile materials may be chosen for the textured layer 106 which are good technical choices but not necessarily good economic choices. These include ruthenium, palladium, platinum, tin, lead, silver, and gold.

If NiP is used as the textured layer 106, the composition of Ni and P in the layer is important. The most preferred method of deposition of NiP on the texture stop layer 104 is a conventional sputtering process. Film growth in a sputtering method is generally improved when the substrate 102 is heated above 250° C. However, when NiP is deposited on substrates heated above 250° C. for compositions where the amount of P in NiP is less than about 13% by weight, the NiP layer becomes crystalline. The crystalline form of NiP is not acceptable because it is ferromagnetic. If any layer other than the magnetic recording layer 108 is magnetic the recording performance of the magnetic recording layer 108 is greatly disturbed. Therefore the preferred concentration of P in deposited NiP is preferably greater than about 13%.

A disk drive containing an oriented disk on a glass substrate is shown in FIGS. 2a, 2b, and 2c. The cross sectional view of the disk drive 200 in FIG. 2a shows a motor 202 and a disk 204 connected with the motor 202. The disk 204 according to an embodiment of the present invention has a glass substrate and a texture stop layer sputter deposited over the substrate. The textured layer is formed over the texture stop layer and subsequently textured before the deposition of the optional magnetic underlayers and magnetic layers. The disk drive 200 also has an actuator 206 and a head gimbal assembly 208 attached to the actuator 206. The head gimbal assembly 208 has a recording head 210 for magnetic recording on the disk 204. A top down view of the disk drive according to the 1—1 line in FIG. 2*a* is shown in FIG. 2*b*. An enlarged area of the disk surface according to the line 2—2 in FIG. 2*b* is shown in FIG. 2*c*. In FIG. 2*c* the texture features 212 are shown to be substantially circumferential and discontinuous. Another embodiment of the texture features is shown in FIG. 2*d*. In FIG. 2*d* an enlarged area of the disk surface according to the line 2—2 in FIG. 2*b* is shown wherein the texture features 214 are substantially circumferential and generally continuous.

While the invention has been described above in connection with preferred embodiments thereof and as illustrated by the drawings, those with skill in the art will readily recognize alternative embodiments of the invention can be easily produced which do not depart from the spirit and scope of the invention as defined in the following claims.

We claim:

1. A magnetic recording disk for use in a disk drive, comprising:
    a glass substrate;
    a texture stop layer formed over said substrate, said texture stop layer having a thickness of less than 500 nm;
    a textured layer formed over said texture stop layer, said textured layer being textured in a substantially circumferential direction and having a thickness less than 200 nm;
    a magnetic layer formed over said textured layer; and,
    an overcoat layer formed over said magnetic layer,
        wherein the hardness of said texture stop layer is greater than the hardness of said textured layer.

2. A disk as in claim 1 wherein said disk has a magnetic underlayer disposed between said magnetic layer and said textured layer.

3. A disk as in claim 1 wherein said texture stop layer is comprised of titanium, tantalum, tungsten, boron nitride, or tantalum nitride.

4. A disk as in claim 1 wherein said texture stop layer is comprised of vanadium, niobium, molybdenum, carbon, zirconium, boron carbide, silicon carbide, titanium carbide, or titanium nitride.

5. A disk as in claim 1 wherein said textured layer comprises aluminum, copper, NiP, ruthenium, palladium, platinum, tin, lead, silver, or gold.

6. A disk drive, comprising:
    a motor;
    a disk connected with said motor, said disk having a glass substrate, a texture stop layer formed over said substrate, said texture stop layer having a thickness of less than 500 nm, a textured layer formed over said texture stop layer, said texture layer being textured in a substantially circumferential direction and having a thickness of less than 200 nm, and a magnetic recording layer formed over said textured layer, wherein the hardness of said texture stop layer is greater than the hardness of said textured layer;
    an actuator; and,
    a head gimbal assembly attached to said actuator, wherein said head gimbal assembly has a recording head for magnetic recording on said disk.

7. A disk as in claim 6 wherein said texture stop layer is comprised of titanium, tantalum, tungsten, boron nitride, or tantalum nitride.

8. A disk as in claim 6 wherein said texture stop layer is comprised of vanadium, niobium, molybdenum, carbon, zirconium, boron carbide, silicon carbide, titanium carbide, or titanium nitride.

9. A disk as in claim 6 wherein said textured layer comprises aluminum, copper, NiP, ruthenium, palladium, platinum, tin, lead, silver, or gold.

* * * * *